Apr. 10, 1923.
S. E. GILLEY
AUXILIARY SEAT FOR AUTOMOBILES
Filed June 13, 1922
1,451,655
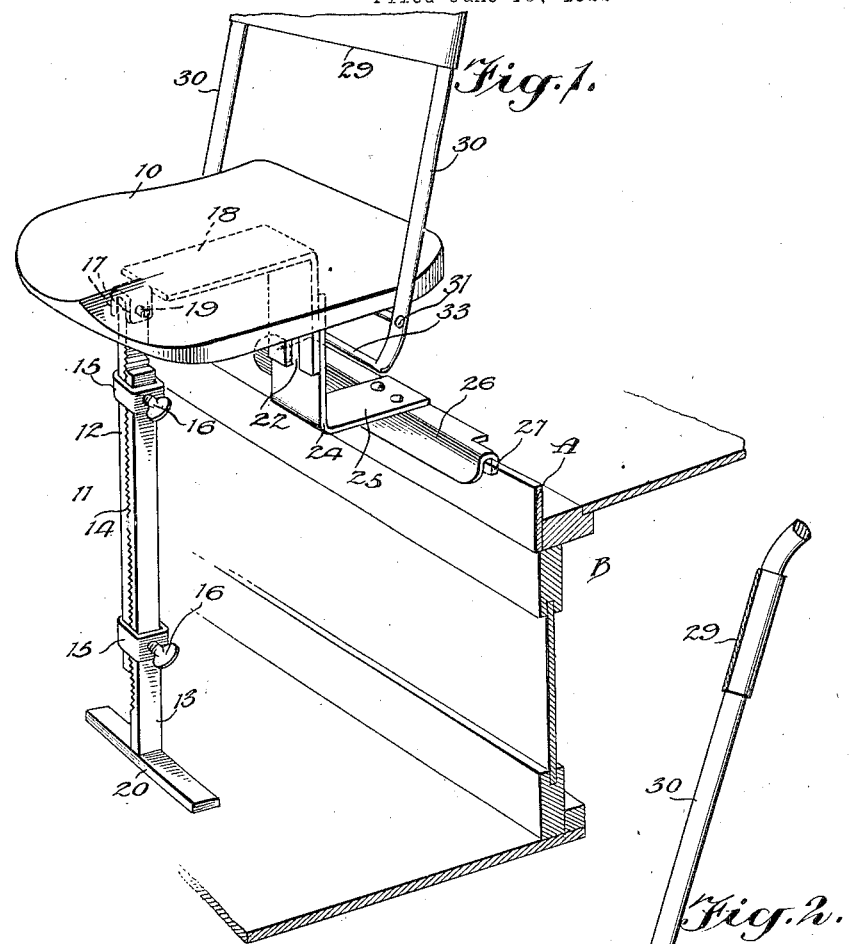
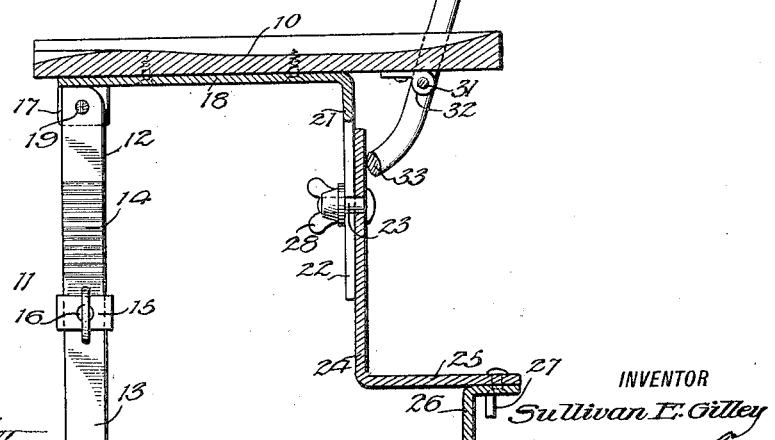
WITNESSES
INVENTOR
Sullivan E. Gilley
BY
ATTORNEYS Patented Apr. 10, 1923.

1,451,655

UNITED STATES PATENT OFFICE.

SULLIVAN E. GILLEY, OF NEW YORK, N. Y.

AUXILIARY SEAT FOR AUTOMOBILES.

Application filed June 13, 1922. Serial No. 567,899.

*To all whom it may concern:*

Be it known that I, SULLIVAN E. GILLEY, a citizen of the United States, and a resident of the city of New York, borough of the Bronx, in the county of Bronx and State of New York, have invented a new and Improved Auxiliary Seat for Automobiles, of which the following is a full, clear, and exact description.

This invention has relation to seats and has particular reference to an auxiliary seat for automobiles.

The principal object of the present invention is to provide means for increasing the permanent seating capacity of an automobile by the provision of one or more auxiliary or emergency seats which are adapted to be partially supported from and in front of the permanent seat.

As a further object the invention aims to provide an auxiliary seat for an automobile which in no way interferes with the regular seating capacity and which operates to comfortably accommodate additional passengers without crowding or discomfort to the occupants.

As a further object the invention provides an auxiliary seat for automobiles which includes means of adjustment to render the same applicable to machines of various types and sizes.

As a still further object the invention contemplates an auxiliary or emergency seat which may be folded or collapsed to occupy a minimum amount of space when not in use whereby the same may be stored under the permanent or regular seat.

The invention furthermore contemplates a seat of the character described which is extremely simple in its construction, inexpensive to manufacture and strong and durable, and which may be readily arranged in position or removed.

With the above recited and other objects in view, the invention resides in the novel construction set forth in the following specification, particularly pointed out in the appended claims and illustrated in the accompanying drawing, it being understood that the right is reserved to embodiments other than those actually illustrated herein to the full extent indicated by the general meaning of the terms in which the claims are expressed.

In the drawing—

Figure 1 is a fragmentary perspective view of an automobile structure illustrating an auxiliary seat constructed in accordance with the invention in its applied position.

Fig. 2 is a vertical sectional view through the seat removed.

Referring to the drawing by characters of reference, the auxiliary seat comprises a bottom 10 to the under side of which at its forward end a leg 11 is pivotally attached. The leg 11 comprises a pair of sections 12 and 13 which are telescopically adjustable to increase or decrease the length of the leg. The means of adjustment consists in providing in the confronting faces of the sections 12 and 13 interengageable teeth 14 and includes clamping bands 15 which surround the sections and have threaded therethrough clamping screws 16. The leg 11 is preferably pivoted between the downturned spaced ears 17 at the forward extremity of a strap 18, a cotter pin or bolt 19 passing through the ears and the upper extremity of the leg. The lower extremity of the section 13 of the leg is preferably provided with a bearing foot 20. The strap 18 is provided at its rear end with a downturned extremity 21 which is centrally slotted as at 22 from its lower end to receive and accommodate the clamping bolt 23 passed through the rear supporting bracket 24. The rear supporting bracket is of angular formation and has attached to the rear extremity of its horizontal arm 25, a transverse bearing element 26 which is of angular construction and provided at its opposite extremities with downturned lugs 27 disposed in spaced relation to the vertical depending flange of the element 26 to afford therebetween a receiving space which is designed to fit over the upwardly projecting flange A at the front of the rear seat B, said flange A being common to the rear seat construction of practically all automobiles. The winged nut 28 which engages the bolt 23 serves to hold the rear supporting bracket 24 in properly adjusted relation with respect to the seat bottom 10 and admits of the removal of the same from the downturned extremity 21. A pivoted back rest 29 is associated with the seat and is designed to fold downwardly and forwardly over the seat bottom when the same is not in use. The back rest consists of side arms 30 through which a transverse rod 31 passes, said rod being received in bearing eyes 32 attached to the under side of the seat. The lower ends of the side arms 30 are connected by a crossbar 33 which engages and coacts with the vertical arm of the rear supporting bracket 24 to limit the rearward swinging of the back rest.

In use of the auxiliary seat, the bearing element 26 is engaged over the upwardly projecting flange A of the permanent seat structure B and the leg 11 is adjusted to dispose the seat bottom 10 in a horizontal plane, the seat being supported at its forward end by the leg 11 and the rear end by the rear bearing bracket 24. Under this arrangement an extra passenger may be accommodated without discomfort to the occupants of the permanent seat in view of the fact that the rear bearing bracket 24 will protrude forwardly from the rear permanent seat structure either between the legs of one of the passengers or between the legs of adjacent passengers. The seat bottom is sufficiently elevated to clear the knees of the passengers of the permanent seat and it is therefore obvious that a practical means for increasing the seating capacity of the machine has been provided. When not in use the auxiliary seat may be compactly folded to occupy a minimum amount of space or storage under one of the seats of the car.

I claim:

1. An auxiliary seat for automobiles comprising a seat bottom having an extensible supporting leg pivoted to and depending from its under forward end for engagement with the floor of the vehicle, a vertically adjustable supporting bracket depending from the under side of the seat bottom and including a rearwardly projecting portion, a laterally disposed bearing element carried by the rear end of the rearwardly projecting portion of the bracket, and means on said bearing element adapted to engage over an upstanding flange at the front of a permanent seat structure to afford means for supporting the rear end of the auxiliary seat from the permanent seat and above the plane of the latter.

2. An auxiliary seat for automobiles comprising a seat bottom, a longitudinal member secured to the under side of the seat bottom, an extensible supporting leg pivotally attached to the forward end thereof, a vertically adjustable bracket attached to the rear end of said member, a rearwardly projecting portion on said bracket, a laterally disposed bearing element carried by the rear end of said portion, and means on said bearing element adapted to embrace the upper edge of an upstanding flange of a permanent seat structure to afford means for supporting the rear end of the seat therefrom.

SULLIVAN E. GILLEY.